Patented Apr. 1, 1952

2,590,852

UNITED STATES PATENT OFFICE 2,590,852

ESTERS OF ACYLATED LACTIC ACID

Martin L. Fein, Riverside, N. J., and Charles H. Fisher, Abington, Pa., assignors to the United States of America as represented by the Secretary of Agriculture No Drawing. Application November 20, 1947, Serial No. 787,261

11 Claims. (Cl. 260—345)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This application is a continuation in part of our copending application Serial No. 588,882, filed April 17, 1945, now Patent No. 2,443,873.

This invention relates to compositions comprising esters of alpha-acyloxypropionic acids and has among its objects the provision of new compositions of matter and processes for their preparation. Another object of the invention is to provide plasticizing agents suitable for use with cellulose derivatives such as cellulose acetobutyrate or ethyl cellulose and also with polyvinyl resins such as coploymers of vinyl acetate and vinyl chloride.

We have found that esters of lactic acid can be converted to the corresponding esters of alpha-acyloxypropionic acid by interaction with acyl halides of higher fatty acids. We have further found that the resulting products are compatible with ethyl cellulose and with copolymer of vinyl chloride and vinylacetate and are useful as modifying agents adapted to enhance the mechanical characteristics of these resins.

In accordance with this invention the ester of lactic acids is reacted with an acyl halide preferably in the presence of a solvent or diluent, and an organic base capable of combining with the hydrogen halide liberated in the reaction. The resulting ester of alpha-acyloxy propionic acid can be recovered from the reaction mixture by distillation.

Suitable esters of lactic acid include the esters of lactic acid with aromatic and aliphatic ether alcohols or with tetrahydrofurfuryl alcohol described in application Serial No. 588,882 and also alkyl esters of lactic acid. Suitable acyl halides are those of higher saturated fatty acids containing from seven to eighteen carbon atoms, like heptoylchloride, pelargonyl chloride, or lauroyl chloride. In producing the plastic compositions of this invention the synthetic resin and the modifying agent may be combined by dissolving them in a common solvent and allowing the solvent to evaporate, or by milling or by any other conventional technique. Fillers, dyes, extenders, pigments and other compounding ingredients may be included if desired.

The following Examples I through IV describe the preparation of some suitable lactic acid esters. Others are described in application Serial No. 588,882.

EXAMPLE I

One mole of 81.8 percent lactic acid (110 grams) in aqueous solution was refluxed with 75 ml. of benzene under a Vigreux column (200 mm. long) which supported a moisture trap (Barrett modification of the Dean and Stark tube). After about 20 cc. of water had been removed, 4 moles of beta-butoxyethanol (472 grams) and 1 cc. of concentrated $H_2SO_4$ were added. After continuing the refluxing as described above for about 10 hours, a total of 24 cc. of water was removed. When the flask had cooled 4 grams of anhydrous sodium acetate was added to neutralize the catalyst. The benzene present was distilled at about 30 mm. The excess alcohol was removed by distillation at 51° C. under a pressure of 4 mm. Butoxyethyl lactate was distilled at 107° to 108° C. at 4 mm.; $N_D^{20}=1.4320$. The yield was 154 grams or 81 percent of the theoretical.

EXAMPLE II

Using the procedure described in the foregoing example chloroethoxyethyl lactate was prepared from one mole of lactic acid and four moles of beta-chloroethoxyethanol. The ester distilled at 111° C. under a pressure of 1.6 mm.; $N_D^{20}=1.4568$. The yield was 79 percent of the theoretical.

EXAMPLE III

Using the procedure of Example I, beta-butoxyethoxyethyl lactate was prepared from one mole of lactic acid and four moles of beta-butoxyethoxyethanol. The ester distilled at 119° C. under 1–2 mm. pressure; $N_D^{20}=1.4400$. The yield was 63 percent of the theoretical.

EXAMPLE IV

Tetrahydrofurfuryl lactate was prepared by a procedure analogous to that described in Example I except that no catalyst was used and 4 moles of tetrahydrofurfuryl alcohol was added to the flask containing the lactic acid from which about 20 cc. of water had been removed. During the 10 hours of refluxing 22 cc. of water was collected in the trap. Benzene was removed by distillation at atmospheric pressure. The excess alcohol was distilled at 56° to 59° C. (4 to 5 mm). The ester was collected at 114°–115° C. under a pressure of 5 mm.; $N_D^{20}=1.4555$. The yield was 79 percent of the theoretical.

The following examples illustrate the preparation of the esters of this invention:

EXAMPLE V

Lauroyl chloride (0.5 mole, 109.4 g.) was added slowly with constant stirring to a cooled mixture of beta-butoxyethyl lactate (0.5 mole, 95.1 g.), pyridine (50 g.) and benzene (100 ml.), while maintaining the reaction temperature below 20° C. When the reaction was completed, a small amount of water was added to dissolve the pyridine hydrochloride formed. The benzene layer, containing the desired product, was separated and washed with aqueous solution of sodium chloride to remove free acidity. The neutral benzene layer was then dried over anhydrous sodium sulfate and the solvent distilled under reduced pressure. Beta-butoxyethyl ester of alpha-lauroyloxy-propionic acid (beta-butoxyethyl lactate laurate) was distilled at approximately 203° C. under 3 mm. pressure; $N_D^{20}=1.4412$.

Other esters of alpha-acyloxypropionic acid were prepared by the use of various reactants in accordance with the method described in Example V. The results obtained are given in the following table:

*Table I*

| Example No. | Reactants | | Product | B. P. (approx.) | $N_D^{20}$ |
|---|---|---|---|---|---|
| | Lactate | Acid Chloride | | | |
| VI | beta-Butoxyethyl | Pelargonyl | beta-Butoxyethyl lactate pelargonate. | 176°C./5.5 mm | 1.4379 |
| VII | Tetrahydrofurfuryl | Lauroyl | Tetrahydrofurfuryl lactate laurate. | 205°C./2.7 mm | 1.4522 |
| VIII | do | Heptoyl | Tetrahydrofurfuryl lactate heptoate. | 171°C./5.4 mm | 1.4478 |
| IX | Butyl | do | Butyl lactate heptoate | 142°C./6.6 mm | 1.4290 |
| X | do | Lauroyl | Butyl lactate laurate | 200°C./9.8 mm | 1.4388 |
| XI | beta-Chloroethoxyethyl | Pelargonyl | beta-Chloroethoxyethyl lactate pelargonate. | 162°C./2.0 mm | 1.4490 |
| XII | Tetrahydrofurfuryl | do | Tetrahydrofurfuryl lactate pelargonate. | 202°C./10 mm | 1.4498 |
| XIII | Butyl | do | Butyl lactate pelargonate. | 143°C./3.0 mm | 1.4335 |
| XIV | beta-Butoxyethoxyethyl | do | beta-Butoxyethoxyethyl lactate pelargonate. | 191°C./4.5 mm | 1.4402 |

All the products of Examples V–XIV are compatible with ethyl cellulose, cellulose acetate butyrate and polyvinyl resins (vinyl chloride-vinyl acetate copolymers) but not with cellulose acetate.

The plasticizing efficiency of these products was determined by compounding them with a polyvinyl chloride-acetate copolymer (95% vinyl chloride, 5% vinyl acetate) using a procedure analogous to that described by Kent and Weaver (1947, India Rubber World, 115, 813–816). The results of some of these tests are shown in the following table:

*Table II*

| Plasticizer Used | 100% Modulus, p.s.i. |
|---|---|
| Product of Example VII | 1,110 |
| Product of Example VIII | 910 |
| Product of Example IX | 2,900 |
| Product of Example X | 1,170 |
| Product of Example XI | 1,110 |
| Product of Example XII | 1,060 |
| Product of Example XIV | 1,110 |

Having thus described our invention, we claim:

1. A plasticizer and modifier for polyvinyl-chloride-acetate resins being a compound corresponding to the general formula:

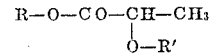

wherein R is a radical of the group consisting of butyl, tetrahydrofurfuryl, butoxyethyl, chloroethoxyethyl, and butoxyethoxyethyl, and R' is the acyl radical of a fatty acid containing from 7 to 18 carbon atoms.

2. A compound defined as in claim 1 wherein R' is heptoyl.

3. A compound defined as in claim 1 wherein R' is pelargonyl.

4. A compound defined as in claim 1 wherein R' is lauroyl.

5. A plasticizer and modifier for polyvinyl chloride-acetate resins being a compound corresponding to the general formula

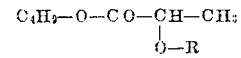

wherein R is the acyl radical of a saturated fatty acid containing from 7 to 18 carbon atoms.

6. A plasticizer and modifier for polyvinyl chloride-acetate resins being a compound corresponding to the general formula

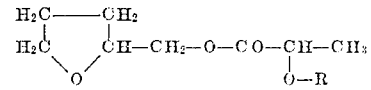

wherein R is the acyl radical of a saturated fatty acid containing from 7 to 18 carbon atoms.

7. A plasticizer and modifier for polyvinyl chloride-acetate resins being a compound of the formula

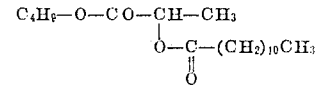

8. A plasticizer and modifier for polyvinyl chloride-acetate resins being a compound of the formula

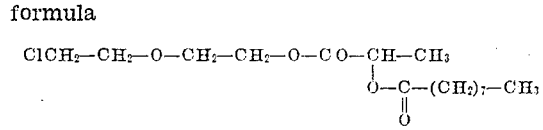

9. A plasticizer and modifier for polyvinyl chloride-acetate resins being a compound of the formula

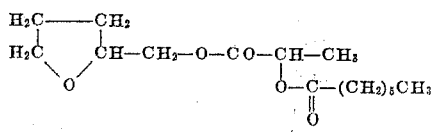

10. A plasticizer and modifier for polyvinyl chloride-acetate resins being tetrahydrofurfuryl lactate laurate, of the formula:

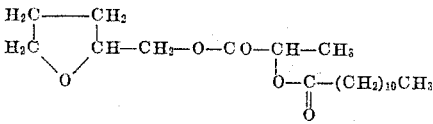

11. A plasticizer and modifier for polyvinyl chloride-acetate resins being tetrahydrofurfuryl lactate pelargonate, of the formula:

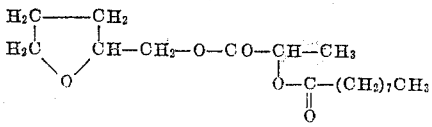

MARTIN L. FEIN.
CHARLES H. FISHER.

REFERENCES CITED

The following references are of record in the file of this patent:

UNITED STATES PATENTS

| Number | Name | Date |
|---|---|---|
| 1,927,295 | Powers | Sept. 13, 1933 |
| 2,046,150 | Cox et al. | June 30, 1936 |
| 2,122,716 | Graves | July 5, 1938 |
| 2,222,363 | Claborn | Nov. 19, 1940 |
| 2,232,933 | Wiley et al. | Feb. 25, 1941 |
| 2,421,378 | Guest et al. | June 3, 1947 |